United States Patent Office 3,105,771
Patented Oct. 1, 1963

3,105,771
SURFACING COMPOSITIONS COMPRISING A MIXTURE OF A POLYEPOXIDE, A POLYAMIDE, AND A PETROLEUM DERIVED BITUMINOUS MATERIAL
Warren C. Simpson, Berkeley, and Harry J. Sommer, Lafayette, Calif., assignors to Shell Oil Company, a corporation of Delaware
No Drawing. Filed Apr. 28, 1958, Ser. No. 731,103
19 Claims. (Cl. 117—32)

This invention relates to new compositions of matter which are particularly suited for use in the construction of roadways. More particularly the invention relates to new compositions containing asphaltic materials which are especially suited for use as binders and coatings for roadways, airfields, walkways and the like.

Specifically, the invention provides new and particularly useful composition comprising a mixture of (1) a polyepoxide having more than one vic-epoxy group, and preferably a glycidyl ether of a polyhydric phenol, (2) an amino hydrogen containing polyamide comprising the reaction product of a polybasic acid having at least seven carbon atoms between the acidic groups and an aliphatic polyamine, and (3) a petroleum derived bituminous material. As a special embodiment, the invention provides a method for utilizing the above-described compositions as binders for aggregate in the construction of roadways and walkways. As a further embodiment, the invention further provides a method for utilizing these compositions as surfacing materials for already prepared concrete, asphalt, wood, and steeel surfaces.

There is a growing need for better materials for construction of roadways, airfields and the like. Such materials, for example, should have better wear resistance, better solvent and heat resistance (as in the case of asphalt roads) and better resistance to skidding. There is also a need for an economical surfacing composition that can be applied to already formed concrete and asphalt road or storage areas to help reduce the destruction due to wear, rain, deicing salts and cold weather. In the case of asphalt surfaces, there is also a need for coatings which would improve resistance to heat and solvents. This is particularly urgent in the case of asphalt runways for jet aircraft as the heat and jet fuels readily attack asphalt surfaces. Further, concrete and asphalt road surfaces and exposed metal on bridge roadways, etc., tend to develop dangerously smooth surfaces due to wear which cause skidding when wet and there is a great need for a non-skid coating that will adhere to these surfaces.

Various compositions have been suggested for the above purposes, but the compositions suggested heretofore have not proved very satisfactory. In most cases, the compositions fail to have any improved wearability, solvent resistance or skid resistance. In the case of the coatings, the coatings fail to have the necessary adhesion to the concrete, asphalt and metal surfaces, particularly if they are the least oily or dirty. In other cases, the coatings are too hard and brittle for use on large areas. In still other cases, the coatings fail to stand up under inclement weather conditions. In still other cases, the coatings fail to have the necessary resistance to solvents and heat or fail to have good wear and non-skid properties. In still other cases, the coatings are too expensive or too difficult to apply.

It is an object of the invention, therefore, to provide new compositions which are suitable for use as in the construction of new roadways, airfields, walkways, and the like. It is a further object to provide a binder for use in making improved roadways and walkways. It is a further object to provide new surfacing compositions which when cured have excellent adhesion to concrete, asphalt, wood and metal surfaces. It is a further object to provide new compositions which form coatings for concrete, asphalt, wood and metal having excellent resistance to wear, rain and cold weather. It is a further object to provide coatings which are resilient and flexible. It is still a further object to provide new surfacing compositions which form films having good resistance to solvents, heat and deicing salts. It is a further object to provide new surfacing compositions which have excellent skid resistance. It is a further object to provide new coatings which are relatively inexpensive and can be easily applied to new and old surfaces. Other objects and advantages of the invention will be apparent from the following detailed description thereof.

It has now been discovered that these and other objects may be accomplished by the compositions of the invention comprising a mixture of (1) a polyepoxide having more than one vic-epoxy group, (2) a polyamide containing amino-hydrogen and comprising the reaction product of a polybasic acid having at least seven carbon atoms between the acidic groups and an aliphatic polyamine, and (3) a petroleum derived bituminous material.

It has been unexpectedly found that the above-described compositions are excellent binders for aggregate and in combination therewith form compositions which can be used to form superior roadways, airfields, walkways and the like. The roadways, etc. prepared from these special compositions have excellent wearability, flexibility, excellent heat resistance and solvent resistance and good skid resistance.

It has also been found that these mixtures form compatible films and coatings which when cured have excellent adhesion to concrete, asphalt, wood and metal surfaces. In addition, the coatings are resilient and tough and have good resistance to outdoor weather conditions. The coatings also display good resistance to solvents and heat. When small inert particles are added to the coating, the compositions have excellent resistance to skidding. The coatings are particularly attractive for use on highways and runways as they can be easily applied to large areas and set up quickly without the use of any special curing conditions. These compositions have been found to be useful not only for the treatment of highways and road surfaces, but are equally valuable for the treatment of dock areas, warehouse floors, sidewalks, tennis courts, ship decks, and the like where wear and weather resistant properties are desired.

A particular advantage of the new compositions is the fact that they may be cured at low temperatures and do not require the use of special heating means. A further advantage is the fact that many of the compositions, and particularly those prepared from the residual fuel oils or compositions containing diluents, such as the hydrocarbon nitriles, monoglycidyl derivatives and the like, have low viscosities and can be sprayed, brushed or otherwise applied, and are thus more easily handled than conventional coatings or binders.

It was quite unexpected to find that the above-noted mixtures would be useful for these applications because heretofore it had been found that certain asphalts, such as paving grade asphalts, were substantially incompatible with glycidyl polyethers. The above-described mixtures, however, have excellent compatibility and form tough, homogeneous compositions. In addition, it was found that the cured products have the above-noted superior properties, such as superior flexibility. This was unexpected as the asphalts alone formed brittle products heretofore.

The bituminous material used in the present compositions are those derived from petroleum, such as, for example, asphalts, residual fuel oils and the like. Preferred asphalts comprise straight run, blown, cracked, aromatic, and catalytically or non-catalytically polymerized asphalts. Beneficial effects are attained by the modification of all types of asphalts regardless of their original penetrations or softening points. Aromatic asphalts may be improved with respect to their flexibility by use of the present invention and thus broaden the possible uses of these products which are normally hard and brittle. A typical aromatic asphalt comprises the bottoms product from the distillation of catalytically cracked gas oil.

Straight run asphalts which are used, for example, for paving grade purposes are greatly improved by the incorporation of the polymerized products as described previously. Normally, straight run asphalts particularly suitable for paving purposes have penetrations between about 40 and about 300 and softening points within the rannge from about 145° F. to about 95° F. Blown asphalts, suitable for use in roofing may be improved with respect to their penetration and softening point relationships by the use of the present invention. Blown asphalts are normally produced in the presence or absence of catalysts by blowing at elevated temperatures with an oxygen-containing gas such as air. A typical asphalt may have softening point range of between about 240° F. and about 160° F. and a penetration within the range from about 30 to about 5.

Other preferred materials include high boiling extracts of petroleum, such as those obtained by extracting petroleum with solvents having preferential selectivity for aromatic. To obtain such extracts various non-reactive, highly polar, aromatically preferential solvents are used such as liquid $SO_2$, phenol, cresylic acid, furfural, beta, beta-dichloroethyl ether, nitrobenzene and the like. The use of the so-called double solvent process employing mutually immiscible solvents like cresylic acid and propane also gives suitable extracts. Especially preferred are the Edeleanu and furfural extracts of petroleum distillates, i.e., extracts obtained by use of liquid $SO_2$ or liquid $SO_2$ in combination with benzene, etc. The extracts are high-boiling materials which range in general from viscous liquids to tar-like materials at ordinary temperatures. Extracts boiling above 300° C. at 760 mm. Hg are preferred.

Another preferred group of bituminous materials include residual fuel oils, such as residual fuel oils having a viscosity between 10 cs. at 100° F. to about 1500 cs. at 100° F.

The polyepoxides to be used in preparing the compositions of the invention comprise those materials possessing more than one vicinal epoxy group, i.e., more than one

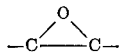

group. These compounds may be saturated or unsaturated, aliphatic, cycloaliphatic, aromatic or heterocyclic and may be substituted with substituents, such as chlorine, hydroxyl group, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linolenate, butyl linolenate, ethyl 9,12-octadecadienoate, butyl 9,12,15-octadecatrienoate, ethyl elaeostearate, octyl 9,12-octadecadienoate, methyl elaeostearate, monoglycerides of tung oil fatty acids, monoglycerides of soybean oil, sunflower, rapeseed, hempseed, sardine, cottonseed oil, and the like.

Another group comprises the diglycidyl esters of dibasic acids such as adipic, pimelic, suberic, azelaic, sebacic, maleic, phthalic, terephthalic, isophthalic and the like.

Another group of the epoxy-containing materials used in the process of the invention includes the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxybutyl) tetrahydrophthalate, di(4,5-epoxydodecyl) maleate, di(2,3 - epoxybutyl) tetraphthalate, di(2,3 - epoxypentyl) thiodipropionate, di(5,6-epoxytetradecyl) diphenyldicarboxylate, di(3,4-epoxyheptyl) sulfonyldibutyrate, tri(2,3-epoxybutyl)-1,2,4-butanetricarboxylate, di(5,6-epoxypentadecyl) tetrate, di(4,5-epoxytetradecyl) maleate, di(2,3-epoxybutyl) azelate, di(3,4-epoxybutyl) citrate, di(5,6-epoxyoctyl) cyclohexane-1,3-dicarboxylate, di(4,5-epoxyoctadecyl) malonate.

Another group of the epoxy-containing materials include those epoxidized esters of unsaturated alcohols and unsaturated carboxylic acids, such as 2,3-epoxybutyl 3,4-epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials include epoxidized derivatives of polyethylenically unsaturated polycarboxylic acids such as, for example, dimethyl 8,9,12,13-diepoxyeicosanediote, dibutyl 7,8,11,12-diepoxyoctadecanediote, dioctyl 10,11-diethyl-8,9,12,13-diepoxy-eicosanedioate, dihexyl 6,7,10,11-diepoxyhexadecanedioate, didecyl cyclohexane-1,2-dicarboxylate, dicyclohexyl 3,4,5,6-diepoxycyclohexane-1,2-dicarboxylate, dibenzyl 1,2,4,5 - diepoxycyclohexane - 1,2 - dicarboxylate and diethyl 5,6,10,11-diepoxyoctadecyl succinate.

Still another group comprising the epoxidized polyesters obtained by reacting an unsaturated polyhydric alcohol and/or unsaturated polycarboxylic acid or anhydride groups, such as, for example, the polyester obtained by reacting 8,9,12,13-eicosandienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexnyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene styrene copolymers and the like.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A, B, C and D described in U.S. 2,633,458 are good examples of polyepoxides of this type. Other examples include the polyglycidyl ether of 1,1,2,2-tetrakis(4-hydroxy-phenyl)ethane (epoxy value of 0.45 eq./100 g. and melting point 85° C.) polyglycidyl ether of 1,1,5,5-tetrakis (hydroxyphenyl)pentane (epoxy value 0.514 eq./100 g.) and the like and mixtures thereof.

The polyamides used in preparing the compositions of the invention comprise the reaction product of a polybasic acid having at least seven carbon atoms between the acidic groups and an aliphatic polyamide, the resulting product possessing at least one hydrogen attached to an amino nitrogen atom. Examples of polybasic materials used in making these polyamides include, among others, 1,10-decanedioic acid, 1,12-dodecandienedioic acid, 1,20-dicosandienedioic acid, 1,14-tetradecanedioic acid, 1,18-octadecanedioic acid and dimerized and trimerized fatty acids obtained by heat polymerizing drying oil fatty acids under known conditions. Normally, this is effected by utilizing the lower aliphatic esters of the drying oil esters so as to prevent decarboxylation during the heating period. During the heating period dimers and trimers are usually obtained. This process is illustrated in the "Industrial and Engineering Chemistry," vol. 38, page 1139 (1946). The structures of the production so obtained are believed to be those given in "Industrial and Engineering Chemistry," vol. 33, page 89 (1941). Numerous drying oil acids can be used in preparing the polymerized acids, but the preferred acids are those containing from 16 to 24 carbon atoms, such as, for example, linoleic acid, linolenic acid, eleosteric acid, and licanic acid.

The aliphatic polyamines used in preparing the polyamides may be any di-, tri- or tetramines, such as, for example, ethylene diamine, diethylene triamine, triethylene tetramine, tetraethylene pentamine, 1,4-diaminebutane, 1,3-diaminebutane, hexamethylene diamine, 3-(N-isopropylamino)propylamine, and the like.

Especially preferred polyamides are those derived from the aliphatic polyamides containing no more than 12 carbon atoms and polymeric fatty acids obtained by dimerizing and trimerizing ethylenically unsaturated fatty acids containing up to 24 carbon atoms. These preferred polyamides have a viscosity between 10 to 750 poises at 40° C., and preferably 20 to 250 poises at 40° C. Preferred polyamides also have amine values of 50 to 450.

As noted, the polyamides used in the process of the invention possess at least one and preferably two or more hydrogen attached to amino nitrogen atoms. Such products are obtained by controlling the proportion of reactants so that there is always at least one, preferably two or more, free amino hydrogen, such as for example, by using an excess of the polyamine reactant. A process for making such polyamides is illustrated in U.S. 2,450,940 and U.S. 2,695,908 and so much of the disclosure of these patents relating to the preparation of the polyamides is incorporated herein by reference.

The compositions of the invention may be prepared by any suitable method. The compositions may be prepared, for example, by simply mixing the components together with or without the application of heat. If one or more of the components are very thick liquids or solids, it is generally preferred to heat them before or during the mixing. Various solvents or diluents which will evaporate before or during cure may be added to assist in the preparation of the mixture, but the addition of these materials is not generally desirable as it usually lengthens the time of cure of the finished product. Suitable solvents include hydrocarbons, such as xylene, benzene, and the like. It is also convenient in some cases to employ all liquid polyepoxides, such as normally liquid glycidyl polyethers of polyhydric alcohols, as the diluent, or to utilize monoglycidyl derivatives such as butyl glycidyl ether, allyl glycidyl ether, etc., or other reactive materials such as nitriles, as acrylonitrile, propiononitrile and the like.

The ratio of the bituminous material and the polyepoxide in the composition may vary depending upon the properties desired in the resulting product. Compositions having the above-described unexpected properties, such as good compatibility, excellent adhesion and superior coating properties, are obtained when the polyepoxide makes up at least 5% and preferably 15% to 85% by weight of the mixture of bituminous material and polyepoxide.

The amount of the polyamide employed in the composition may vary within certain limits. There should be at least .8 equivalents of the polyamide per equivalent of the polyepoxide. As referred to herein in relation to the proportion of polyamide and polyepoxide, chemical equivalent amount refers to that amount needed to furnish one amino hydrogen per epoxy group. Preferred amounts vary from about .8 to 4 equivalents of the polyamide per equivalent of the polyepoxide and more preferably from 3 to 3.5 equivalents. A portion e.g. up to 50% by weight of the polyamide may be replaced by other materials, such as any of the above-described long chain acids themselves, or with the polyamines or known curing agents, such as polybasic acid anhydrides, alkalis, metal salts and the like.

An especially preferred type of composition covered by the present invention includes those wherein inert solid particles are used either in preparation of roadways or on coatings to give the coating excellent skid resistance. The particles should be rather divided and preferably have a mesh size varying from 4–300. Preferred materials include sand, finely divided rocks, finely divided shells, crushed quartz, fused aluminum oxide grits, finely divided resinous particles, and the like. Particularly preferred are the minerals, and especially the siliceous materials, such as, for example, sand and ground rock. Mixtures of various types of particles may also be used.

The amount of the inert particles to be added to the composition should be at least 50% by weight of the total mixture of bituminous material and polyepoxide and should preferably be between 70% to 2000% by weight of the mixture.

The inert particles may be added to the composition before it is applied, and this is the preferred method when the composition is used as a binder, or the bituminous material-polyepoxide mixture may be first applied to the surface and then the inert particles placed in the coating composition as in the case of coatings. Thus, in coating highway surfaces, the bituminous material-polyepoxide mixture may be applied directly to the road surface and then the inert particles, such as sand, may then be sprinkled onto the coating before it is cured.

The particles may be heated if desired to assist in the cure. Thus aggregate heated to temperatures ranging from about 150° F. to 400° F. is useful in speeding cure of roadbeds and coatings.

When used as coatings, the compositions of the invention may be applied to any surface, but are particularly suitable for use as surfacing compositions for concrete, asphalt, wood, and steel. The concrete may be of any of the usual types such as may be prepared from hydraulic cements, such as. Portland cement and other types of aluminous and oxy salt type cements. The asphalt surfaces may be those prepared from straight run asphalts or further refined or modified asphalts. The compositions may be applied in very thin coatings or in very thick coatings. The application to the surface can be accomplished in any suitable manner. If material is thick or contains large amounts of inert particles, the material may best be applied by use of a screed, trowel, shovel or broom. If it is of a more fluid nature, it may be applied by brushing or spraying. The coatings will generally vary in thickness from about $\frac{1}{16}$ inch to about $\frac{1}{2}$ inch.

The following examples illustrate the present invention. Unless otherwise specified, parts disclosed in the examples are parts by weight. Polyether resins described in the examples by letters are those described in U.S. 2,633,458. The concrete used in the examples was prepared from hydraulic cement (Portland cement), aggregate containing sand and water.

*Example I*

This example illustrates the preparation and some of the properties of a composition containing polyether A, a fluid polyamide of ethylene diamine and dimerized linoleic acid containing amino hydrogen and having a viscosity of 80–120 poises at 40° C. and specific gravity of 0.97, and straight run paving graded asphalt.

12% by weight of polyether A and 52% by weight of straight run asphalt were mixed together with heating. To this mixture was added 36% by weight of a polyamide of diethylene triamine and dimerized linoleic acid and the mixture spread on a section of an asphalt highway which had been cleaned with detergents to form a coating of about 1/16" thickness. In a short time, at atmospheric temperature the composition set up to form a homogenous resilient flexible tough solvent resistant coating that had good adhesion to the concrete.

To test the resistance of the coating to solvents, jet fuel was sprayed twice a day on the coating. No change was noted in the condition of the pavement even after 6 weeks. During a similar period of use and treatment, the unmodified asphalt road softened and commenced to disintegrate.

Metallic panels (steel and aluminum) and concrete panels coated with the above mixture also remained undamaged by jet fuels.

*Example II*

12% by weight of polyether A and 52% by weight of straight run asphalt were combined together with heating. 36% by weight of the polyamide of ethylene diamine and dimerized linoleic acid defined in Example I was then added to the mixture. This mixture was stirred and then spread on smooth concrete at a rate of about 1 pound per square yard. The coating cured to form a resilient tough flexible coating.

In a similar experiment, sand was spread on the coating before cure was complete. The resulting coating set up to form a hard skid resistant film which had good flexibility.

Similar results are obtained by varying the amount of the polyamide from 20% to 10%.

*Example III*

This example illustrates the formation of a thick roadway surfacing.

12% by weight of polyether A and 52% by weight of straight run asphalt were mixed with heating and then 36% by weight of a fluid polyamide of dimerized soybean oil fatty acid and diethylene triamine containing amino hydrogen and having a viscosity of 80–150 poises at 40° C. and an equal weight of the combined mixture of crushed quartz were added. When the mixture was complete, the composition was applied at a rate of 10 pounds per square yard on a concrete surface with screeds and/or trowels. After a smooth layer was applied, additional crushed quartz was sprinkled over the surface and rolled with a lawn roller to gain greater compaction. After hardening was complete, the excess grit was swept off. Concrete surfaces so treated had good resistance to skidding and good resistance to weather conditions.

*Example IV*

This example illustrates preparation and some of the properties of the composition containing polyether D and a polyamide of ethylene diamine containing amino hydrogen and dimerized linoleic acid having a viscosity of 80–120 poises at 40° C. and a low viscosity rapid curing asphalt.

Polyether D was dissolved in a solvent made up of 90 parts of xylene and 10 parts Cellosolve so as to form a 70% solution. The abovenoted polyamide of ethylene diamine and dimerized linoleic acid was dissolved in the same solvent to form an 85% solution. 15% by weight of the polyether D solution, 15% by weight of the polyamide solution and 70% by weight of a medium curing asphalt cut back 100–200 SSF at 140° F. were mixed together with heating. The resulting mixture was spread on a section of concrete highway which had been previously cleaned with hydrochloric acid. The coating was about 1/16 inch thick. In a short time at atmospheric temperature, the composition set up to form a hard tough solvent resistant coating.

*Example V*

The composition prepared in the previous example was spread on an asphalt highway previously cleaned with detergent solution. The coating was about 1/16 inch thick. Sand was then sprinkled on the top before the cure was complete. The resulting coating set up to form a hard tough resilient skid resistant film.

*Example VI*

40 parts polyether A were heated with 60 parts of trimerized linoleic acid to form a precondensation product. The polyamide described in Example I and a medium curing cutback asphalt 100–200 SSF at 140° F. were then added to the precondensate. The components appeared in the following proportions:

23.6% medium curing cutback asphalt
21.3% polyamide
22.0% polyether A
33.1% trimerized linoleic acid This mixture was stirred and 100% by weight of sand added thereto. This mixture was spread as thick coating to concrete blocks and then sand sprinkled on the top before cure was complete. The resulting coating was a tough resilient solvent resistant coating which had good skid resistance.

*Example VII*

Polyether A, the polyamide as described in Example I, as asphalt having viscosity of 705 centistokes at 140° F. and a $C_{12}$ primary amine were combined together with heating. The components were present in the following proportions:

36% polyether A
30% asphalt
20% polyamide
14% $C_{12}$ primary amine

This mixture was stirred and then spread on asphalt highway at the rate of about 1 lb. per square yard. Sand was then spread on top of the coating before cure was complete. The resulting coating set up to form a hard tough resilient skid resistant film.

The above experiment is repeated with the exception that 200% by weight of sand was included in the initial mixture. This mixture was then spread on concrete to form a hard skid resistant coating.

*Example VIII*

This example illustrates the preparation and some of the properties of a composition containing polyether A, a polyamide of ethylene diamine and dimerized soybean oil fatty acids as described in Example I and an asphaltic material comprising the bottoms from the distillation of a catalytically cracked gas oil.

About 15% by weight of polyether A was combined with 65% by weight of the above-described asphaltic material and 20% by weight of the polyamide of ethylene diamine and dimerized soybean oil fatty acid.

This mixture was spread on a section of an asphaltic roadway to form a coating of about 1/16 inch thick. 30 mesh aluminum oxide was strewn over the surface before it had set hard. The resulting coating was a hard tough non-skid coating having good weather resistance.

*Example IX*

10% by weight of polyether B described in U.S. 2,633,458, 70% by weight of straight run asphalt and 20% by weight of an amino hydrogen containing polyamide of 1,20-eicosanedioic acid and ethylene diamine (obtained by heating the components together with a slight excess of the amine) are combined together.

This mixture is spread on section of a concrete highway to form a coating of but 1/16 inch thick. 30 mesh aluminum oxide is strewn over the surface before it has set hard. The resulting coating is a hard tough non-skid coating having good weather resistance.

Related results are obtained by replacing polyether B in the above process with equal amounts of each of the following: Polyether C, poly (allyl glycidyl ether) having a molecular weight of about 450, diglycidyl ether of resorcinol and diglycidyl ether of 2,2-bis(4-hydroxyphenyl) butane.

*Example X*

This example illustrates the preparation and some of the properties of a composition containing polyether A, a polyamide as described in Example I and a residual fuel oil.

About 15% by weight of polyether A was combined with 65% by weight of an industrial fuel oil having the following properties:

| | |
|---|---|
| Gravity, ° API | 8.0 |
| Flash, PMCC, ° F | 180 |
| Pour point, ° F | +35 |
| Viscosity, centistokes | 370 |
| Sulfur, percent w | 1.84 |
| Carbon residue, percent w | 19.0 |

20% by weight of the polyamide described in Example I was then added.

This mixture was then sprayed on a section of an asphaltic roadway to form a coating of about 1/16 inch thick. 30 mesh aluminum oxide was then strewn over the surface before it had set hard. The resulting coating was a hard tough non-skid coating having good weather resistance.

Related results are obtained by replacing the above-described residual fuel oil with another light fuel oil having the following properties:

| | |
|---|---|
| Gravity, ° API | 17.0 |
| Flash, PMCC, ° F | 176 |
| Pour point, ° F | −10 |
| Viscosity, centistokes | 52 |
| Sulfur, percent w | 1.64 |
| Carbon residue, percent w | 9.0 |

*Example XI*

This example illustrates the preparation and some of the properties of a composition containing polyether A, a polyamide of ethylene diamine and dimerized soybean oil fatty acid as described in Example I and an Edeleanu extract of petroleum distillates.

About 15% by weight of polyether A was combined with 65% by weight of an extract of petroleum distillate having the following properties:

| | |
|---|---|
| Gravity, ° API | 5.8 |
| Flash, COC, ° F | 415 |
| Viscosity, SSU, at 210 ° F | 96.1 |
| Aniline point, ° F | 81 |
| Acid No. (TAN-C) | 1.1 |
| Iodine value | 69 |

20% by weight of the polyamide described in Example I was then added. This mixture was then combined with 200% by weight of crushed rock aggregate heated to 250° F. and spread out and rolled on prepared roadbed. After compacting, the roadway was allowed to set hard. The resulting roadway was tough and flexible and had good resistance to solvents and heat.

*Example XII*

Examples I, II, IV and X are repeated with the exception that the polyamide is replaced by a polyamide of dimerized linoleic acid and ethylene diamine having an amine value of 290–320, and a viscosity of 40–60 poises. Amine value is milligrams of KOH equivalent to base content of 1 gram of polyamide as determined by titration with HCl. Related results are obtained in each case.

*Example XIII*

Examples VII, X and XI are repeated with the exception that the polyamide is replaced by a fluid polyamide of 1,18-octadecanedioic acid and ethylene diamine having free amino hydrogen, and by a polyamide of 1,20-eicosanedioic acid and diethylene triamine having free amino hydrogen. Related results are obtained in each case.

*Example XIV*

Example I is repeated with the exception that polyether A is replaced by equivalent amounts of polyether B and polyether C. The same type of tough, flexible solvent resistance coatings are obtained.

To speed up the cure, it is also possible to add epoxy curing agents, such as amines, acids, anhydrides and the like in amounts preferably ranging from about 0.1% to 20% by weight.

We claim as our invention:

1. A composition comprising a mixture of (1) a polyepoxide having more than one vic-epoxy group, (2) a polyamide containing amino hydrogen and comprising the heat reaction product of a polybasic acid having at least seven carbon atoms between the acidic groups and an aliphatic polyamine, and (3) a petroleum derived bituminous material.

2. A composition as in claim 1 wherein the polybasic acid is an aliphatic alpha, omega-dicarboxylic acid containing from 14 to 24 carbon atoms.

3. A composition as in claim 1 wherein the polybasic acid is a polymerized unsaturated fatty acid.

4. A composition for rendering surfaces non-skid comprising a mixture of (1) a polyepoxide possessing more than one vic-epoxy group, (2) an amino hydrogen containing polyamide of a polymerized unsaturated fatty acid and an aliphatic polyamine, (3) an asphalt, (4) at least 50% by weight of the combined mixture of 1, 2 and 3 of small inert particles.

5. A composition as in claim 4 wherein the polyepoxide is a glycidyl polyether of a polyhydric phenol having a molecular weight between 250 and 900.

6. A composition as in claim 4 wherein the polyamide is a heat reaction product of a polymerized soybean oil fatty acid and diethylene tramine.

7. A composition as in claim 4 wherein the asphalt is a straight run asphalt.

8. A composition as in claim 4 wherein the asphalt is the bottom from the distillation of a catalytically cracked gas oil.

9. A composition as in claim 4 wherein the inert particles are sand.

10. A process for preparing a composition useful for road construction which comprises mixing and reacting (1) a polyepoxide having more than one vic-epoxy group, (2) an amino-hydrogen containing polyamide of a polybasic acid having at least seven carbon atoms between the acidic groups and an aliphatic polyamine, and (3) a petroleum derived bituminous material, the amount of the amino-hydrogen containing polyamide making up at least .8 equivalents per equivalent of polyepoxide, and the amount of the bituminous material making up at least 5% by weight of the combined mixture of polyepoxide and polyamide.

11. A process for preparing a roadway which comprises mixing a binder comprising a mixture of (1) a polyepoxide having more than one vic-epoxy group, (2) a polyamide containing amino hydrogen and comprising the heat reaction product of a polybasic acid having at least seven carbon atoms between the acidic groups and an aliphatic polyamine, and (3) a petroleum derived bituminous material, with hot aggregate, spreading the mixture on the roadbed, compacting and allowing to set, the amount of the polyamide making up at least .8 equivalents per equivalent of polyepoxide, and the amount of the bituminous material making up at least 15% by weight of the combined mixture of polyepoxide and polyamide.

12. A process for coating surfaces to improve their wear, solvent resistance and skid resistance which comprises applying thereto a layer of a mixture comprising (1) a polyepoxide having more than one vic-epoxy group, (2) an amino hydrogen containing polyamide of a polybasic acid having at least seven carbon atoms between the acidic groups and an aliphatic polyamine, and (3) a petroleum derived bituminous material, applying small inert particles over the top of the layer of coating material and allowing the mixture to set hard, the amount of the polyamide making up from .8 to 4 equivalents per equivalent of polyepoxide, and the amount of the bituminous material making up from 15% to 85% by weight of the combined mixture of polyepoxide and polyamide.

13. A process as in claim 12 wherein the surface is Portland cement concrete.

14. A process as in claim 12 wherein the surface is asphaltic concrete.

15. A process as in claim 12 wherein the surface is steel.

16. A process as in claim 12 wherein the polyepoxide is a glycidyl polyether of a polyhydric phenol.

17. A process as in claim 12 wherein the asphalt in the coating is a straight run paving grade asphalt.

18. A process as in claim 12 wherein the polyamide is a polyamide of a polymerized unsaturated fatty acid and an aliphatic polyamine.

19. A composition comprising a mixture of a polyepoxide resin possessing more than one epoxy group per molecule of resin, a polyamide containing an amino hydrogen and comprising the reaction product of a polymerized unsaturated fatty acid having at least seven carbon atoms between the acidic groups and an aliphatic polyamine, and a petroleum derived asphalt.

References Cited in the file of this patent

UNITED STATES PATENTS

| | | |
|---|---|---|
| 2,528,417 | Bradley | Oct. 31, 1950 |
| 2,615,007 | Greenlee | Oct. 21, 1952 |
| 2,712,535 | Fisch | July 5, 1955 |
| 2,765,288 | Whittier et al. | Oct. 2, 1956 |

OTHER REFERENCES

Charlton: Modern Plastics, September 1954, pages 155–157, 160–161, 240–243.